US009296366B2

(12) United States Patent
Ukezeki

(10) Patent No.: US 9,296,366 B2
(45) Date of Patent: Mar. 29, 2016

(54) OUTRIGGER CONNECTION LOCKING DEVICE

(71) Applicant: TADANO LTD., Takamatsu, Kagawa (JP)

(72) Inventor: Homurako Ukezeki, Fukui (JP)

(73) Assignee: TADANO LTD., Takamatsu (JP)

( * ) Notice: Subject to any disclaimer, the term of this patent is extended or adjusted under 35 U.S.C. 154(b) by 0 days.

(21) Appl. No.: 14/327,978

(22) Filed: Jul. 10, 2014

(65) Prior Publication Data

US 2015/0030383 A1    Jan. 29, 2015

(30) Foreign Application Priority Data

Jul. 23, 2013 (JP) ................................. 2013-152561

(51) Int. Cl.
*B60S 9/22* (2006.01)
*B66C 23/80* (2006.01)
*B66C 23/78* (2006.01)

(52) U.S. Cl.
CPC . *B60S 9/22* (2013.01); *B66C 23/78* (2013.01); *B66C 23/80* (2013.01); *Y10T 403/581* (2015.01)

(58) Field of Classification Search
USPC ...................... 403/322.3, 322.4, 324; 37/468; 414/723; 172/272–275
See application file for complete search history.

(56) References Cited

U.S. PATENT DOCUMENTS

| 3,840,125 A | 10/1974 | Cozad |
| 4,071,147 A | 1/1978 | Hornagold |
| 4,243,356 A * | 1/1981 | Takojima ...................... 414/723 |
| 4,812,103 A * | 3/1989 | Cochran et al. ............... 414/723 |
| 5,348,171 A | 9/1994 | Haman et al. |
| 7,014,385 B2 * | 3/2006 | Lim et al. .................... 403/322.4 |
| 2004/0218971 A1 * | 11/2004 | Lim et al. .................... 403/322.3 |

FOREIGN PATENT DOCUMENTS

| DE | 20 2007 004922 U1 | 8/2008 |
| EP | 1 000 896 B1 | 6/2004 |
| EP | 1 964 808 A2 | 9/2008 |
| GB | 1 465 289 A | 2/1977 |
| JP | A-2000-143157 | 5/2000 |

OTHER PUBLICATIONS

Nov. 17, 2014 Extended Search Report issued in European Application No. 14178123.7.
Oct. 26, 2015 Office Action issued in Canadian Patent Application No. 2,857,478.

* cited by examiner

*Primary Examiner* — Victor Macarthur
(74) *Attorney, Agent, or Firm* — Oliff PLC

(57) ABSTRACT

There is provided an outrigger connection locking device used in a crane apparatus including a boom, a swivel base that supports the boom so as to be raised and lowered, a carrier frame on which the swivel base is mounted, and an outrigger removably mounted to the carrier frame. The outrigger locking device includes: a connection pin that can be inserted into a carrier frame hole formed in the carrier frame and into an outrigger hole formed in the outrigger; a telescopic cylinder that performs a telescopic motion that allows the connection pin to move to a location in which the connection pin is inserted into the carrier frame hole and the outrigger hole; a connection locking unit that restricts the connection pin inserted into the carrier frame hole and the outrigger hole from moving; and a remote operation mechanism for connection locking that can operate the connection locking unit.

5 Claims, 8 Drawing Sheets

A—A'
CROSS-SECTIONAL VIEW

B-B'
CROSS-SECTIONAL VIEW

OUTRIGGER CONNECTION LOCKING DEVICE

CROSS-REFERENCES TO RELATED APPLICATIONS

This application claims the benefit of Japanese Patent Application No. 2013-152561, filed Jul. 23, 2013, which is incorporated herein by reference.

BACKGROUND

1. Technical Field

The present invention relates to an outrigger connection locking device that is used in a crane apparatus having outriggers removably mounted to a carrier frame that supports a boom, for locking the connection between the carrier frame and the outriggers.

2. Related Art

In recent years, large crane apparatuses, which are not legally permitted to run on public roads, have been developed. Such a large crane apparatus has to be divided into several parts and delivered by a deliver vehicle, and then, the divided parts are assembled on a work place.

Here, among parts of the crane apparatus, an outrigger is particularly heavy, and therefore is supposed to be taken on a trailer and delivered separately from a carrier frame (crane apparatus body), and then, is connected to the carrier frame on the work place. In this case, the outrigger may not be welded to but connected to the carrier frame with pins, and therefore can be removably connected to the carrier frame as disclosed, for example, in Patent literature 1. Meanwhile, when there is not enough space for the worker to connect the outrigger to the carrier frame with pins, each pin may be attached to, for example, the tip of a hydraulic cylinder and the hydraulic cylinder is extended by remote operation, so that the pins can be inserted into pin holes.

Patent Literature 1: Japanese Patent Application Publication No. 2000-143157

However, when the hydraulic cylinder is extended to insert a pin into a pin hole, the pin sometimes drops off when the hydraulic cylinder contracts due to a decrease in the hydraulic pressure. Therefore, it is preferable to automatically keep the hydraulic cylinder extended. Here, a working space is required to automatically lock the connecting pins inserted into the pin holes by extending the hydraulic cylinder. However, there is not always the working space for the connection between the carrier frame and the outrigger.

SUMMARY

It is therefore an object of the present invention to provide an outrigger connection locking device that can easily and safely restrict the movement of the connecting pins that connect the outriggers to the carrier frame without a working space for the connection between the outriggers and the carrier frame.

According to the present invention, an outrigger connection locking device used in a crane apparatus including a boom, a swivel base that supports the boom so as to be raised and lowered, a carrier frame on which the swivel base is mounted, and an outrigger removably mounted to the carrier frame, the outrigger locking device including: a connection pin that can be inserted into a carrier frame hole formed in the carrier frame and into an outrigger hole formed in the outrigger; a telescopic cylinder configured to perform a telescopic motion that allows the connection pin to move to a location in which the connection pin is inserted into the carrier frame hole and the outrigger hole; a connection locking unit configured to restrict the connection pin inserted into the carrier frame hole and the outrigger hole from moving; and a remote operation mechanism for connection locking that can operate the connection locking unit, the remote operation mechanism being located remotely from the connection locking unit.

By this means, it is possible to remotely operate the connection locking unit, and therefore to remotely prevent the connecting pin from dropping off from the carrier frame hole and the outrigger hole.

According to the present invention, it is possible to remotely restrict the movement of the connecting pin inserted into the carrier frame hole and the outrigger hole, and therefore to reliably keep the outrigger connected to the carrier frame even if there is no work space in the connection between the carrier frame hole and the outrigger hole.

DESCRIPTION OF EXEMPLARY EMBODIMENTS

Figure 1:
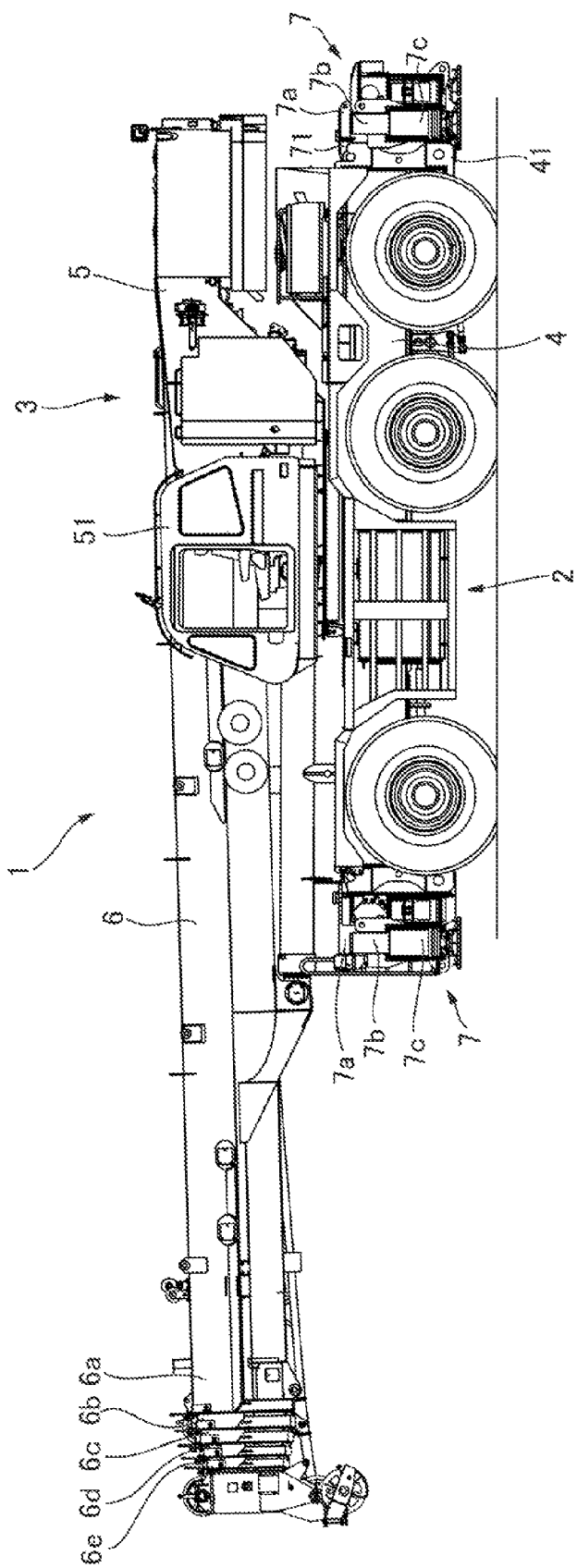
FIG. 1 is a side view showing an exemplary crane vehicle.

FIGS. 1 to 8 show an embodiment of the present invention. As shown in FIG. 1, a crane vehicle 1 having an outrigger connection device includes a vehicle 2 that runs on the roads, and a crane apparatus 3. The vehicle 2 includes: pairs of right and left wheels provided in a plurality of positions of the front body and the back body of the vehicle 2; an engine for a power source to move the vehicle 2; a carrier frame 4 that extends in the running direction of the crane body 2 (hereinafter referred to as "front-to-rear direction"); and outriggers 7 provided on the front end and the rear end of the carrier frame 4. The crane apparatus 3 includes: a swivel base 5 provided on the carrier frame 4; a working cabin 51 provided on the swivel base 5 for driving operation of the vehicle 2 and for working operation of the crane apparatus 3; and a telescopic boom 6 provided to be raised and lowered with respect to the swivel base 5.

The outriggers 7 are mounted to the front end and the rear end of the carrier frame 4, and the swivel base 5 is provided to be able to swivel in the horizontal direction on an approximately middle of the upper surface of the carrier frame 4 in the front-to-rear direction.

The swivel base 5 is provided to be able to swivel on the carrier frame 4 through a ball bearing or roller bearing swing circle provided between the carrier frame 4 and the swivel base 5, and is swiveled by driving a hydraulic swivel motor (not shown).

The boom 6 is constituted by a plurality of boom members (a base boom 6a, a second boom 6b, a third boom 6c, a fourth boom 6d and a top boom 6e), and formed as a telescopic boom in such a manner that the base boom 6a, the second boom 6b, the third boom 6c, and the fourth boom 6d can accommodate the second boom 6b, the third boom 6c, the fourth boom 6d and top boom 6e, which are adjacent and anterior to the base boom 6a, the second boom 6b, the third boom 6c and fourth boom 6d, respectively. The base end of the base boom 6a is coupled to the swivel base 5 so as to be able to be raised and lowered. A hydraulic cylinder (not shown) is provided in the base boom 6a, and extends and contracts to allow the boom 6 to perform telescopic motion.

The outriggers 7 are provided on the front end and the rear end of the carrier frame 4, respectively. Each of the outriggers 7 includes: an outrigger body 7a that extends in the width direction of the vehicle 2; a slide arm 7b that can protrude from the outrigger body 7a to each side; and a jack part 7c provided at the front end of the slide arm 7b in the protruding direction. The slide arm 7b is a columnar member that extends in its longitudinal direction which is the width direction of the outrigger 7. The slide arm 7b slides in the width direction of the outrigger 7 by a slide cylinder (not shown) accommodated in the outrigger body 7a, and therefore is inserted into the outrigger body 7a and protrudes from each side of the outrigger body 7a. The jack part 7c is constituted by a jack cylinder provided on the front end of the slide arm 7b and extending in the vertical direction, and a grounded part that is provided on the lower end of the jack cylinder. During crane operation, the slide arm 7b is protruded from the outrigger body 7a and the jack part 7c is extended downward to ground the grounded part, so that it is possible to prevent the crane vehicle 2 from overturning and to support the vehicle 10 stably.

The carrier frame 4 and the outriggers 7 are removably connected to each other via a plurality of connecting pins. With the present embodiment, the outriggers 7 are connected to the carrier frame 4 in the same way between the front end and the rear end of the carrier frame 4, and therefore the connection on the rear end will be explained. Here, the outriggers 7 can be removably connected to the front and rear end of the carrier frame 4, respectively, but it is by no means limiting. Either of the front and rear outriggers 7 may be fixed to the carrier frame 4 by, for example, welding.

Figure 2:
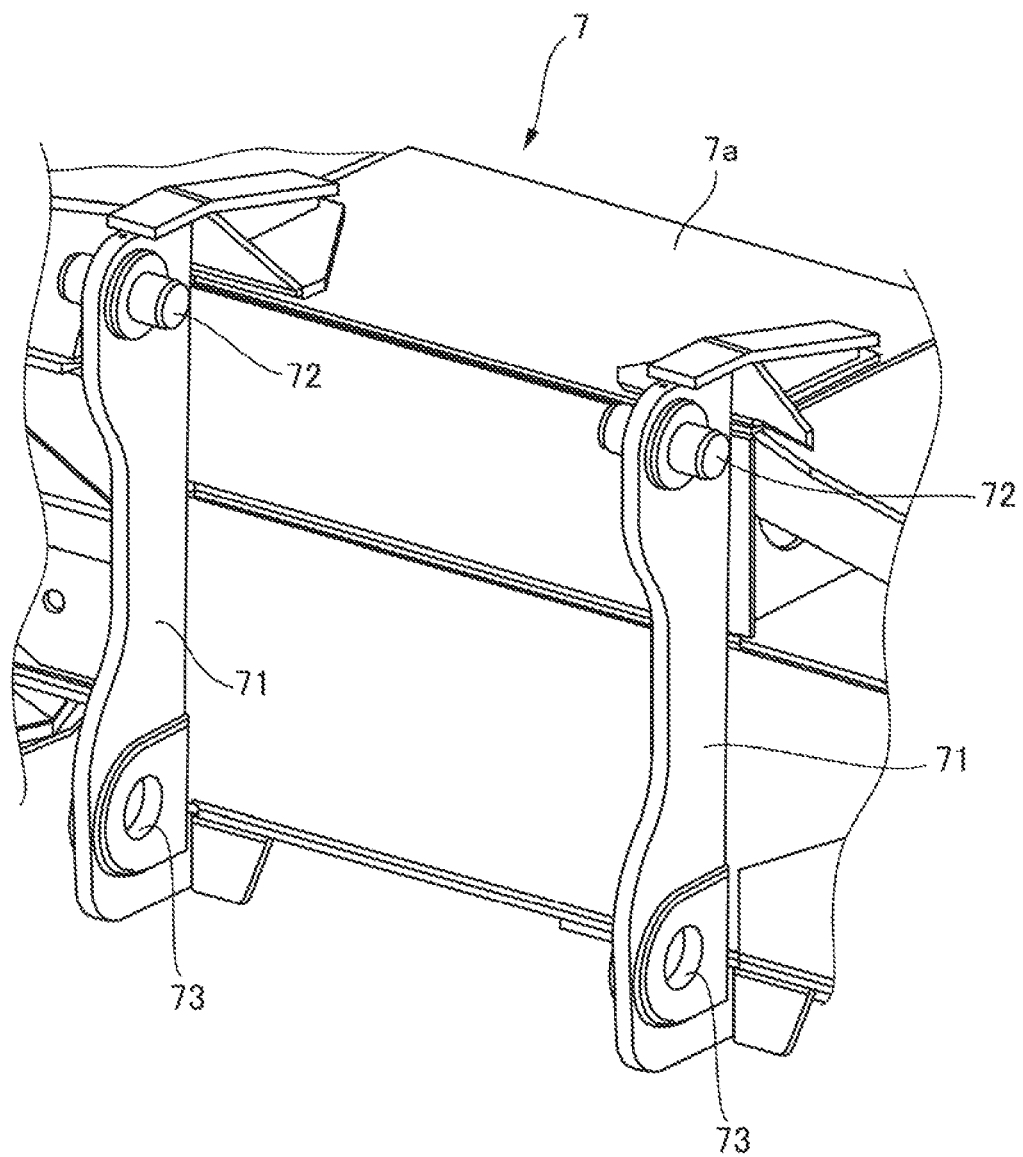
FIG. 2 is a perspective view showing part of an outrigger.

As shown in FIG. 2, two outrigger side panels 71, which extend forward in the vertical direction, are provided on the front end of the outrigger body 7a. These two outrigger side plates 71 are parallel to one another, and arranged side by side at a predetermined interval in the width direction of the outrigger body 7a.

A cylindrical outrigger pin 72 extending in the width direction of the outrigger body 7a penetrates the upper part of each of the outrigger side plates 71 and is fixed. Meanwhile, an outrigger pin hole 73 into which a rod pin 84 and a tube pin 85 described later can be inserted is provided in the lower part of each of the outrigger side plates 71.

Figure 3:
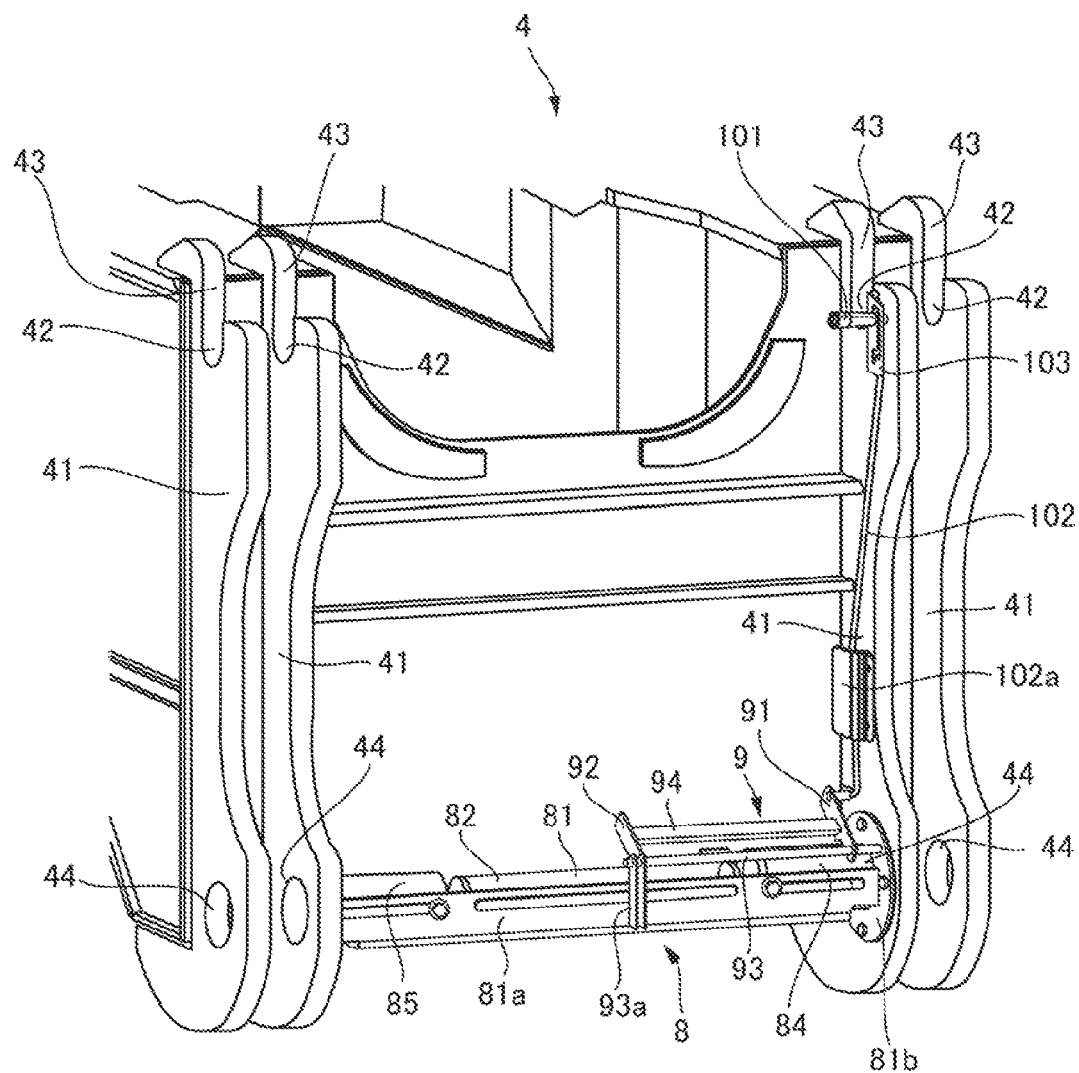
FIG. 3 is a perspective view showing part of a carrier frame.

As shown in FIG. 3, two carrier frame side plates 41, which extend backward in the vertical direction, are provided on each of the right side and left side of the rear end of the carrier frame 4. Each of these two carrier frame side plates 41 are parallel to one another and arranged side by side at a predetermined interval in the width direction of the carrier frame 4. The distance between these two right and left carrier frame side plates 41 is greater than the thickness of the outrigger side plate 71.

A pin engagement part 42 is formed in the upper end of each of the four carrier frame side plates 41. The pin engagement part 42 is concave upward and open-topped. The pin engagement part 42 can engage the outrigger pin 72 provided in the outrigger side plate 71. The pin engagement part 42 has a front side wall and a rear side wall in the front-to-rear direction. Here, the front side wall extends higher than the rear side wall to form a pin guide part 43 that guides the outrigger pin 72 to the pin engagement part 42.

A carrier frame pin hole 44 is provided in the lower part of each of the carrier frame side plates 41. The carrier frame pin hole 44 is circular and is open in the width direction of the carrier frame 4. The tube pin 85 is inserted into the carrier frame pin holes 44 formed in the two left carrier frame side plates 41. Meanwhile, the rod pin 84 can be inserted into the carrier frame pin holes 44 formed in the two right carrier frame side plates 41.

There are provided a connection device 8 and a connection locking device 9 between the lower part of the left inside carrier frame side plate 41 and the lower part of the right inside carrier frame side plate 41. The connection part 8 connects between the lower part of the carrier frame 4 and the lower part of the outrigger 7. The connection locking device 9 keeps the connection device 8 connecting between the carrier frame 4 and the outrigger 7.

Figure 4:
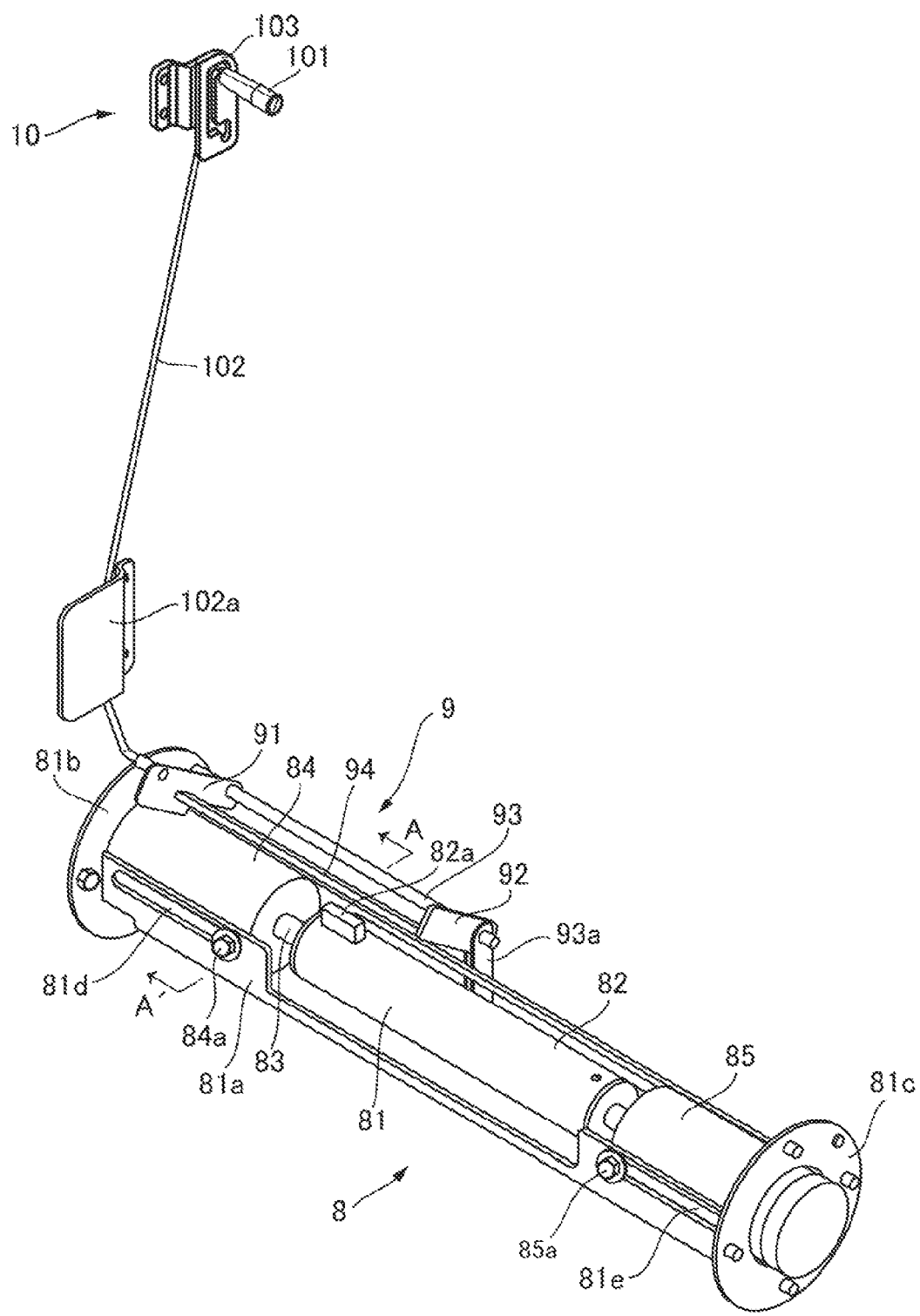
FIG. 4 is a drawing showing an arrangement of a connection device, a connection locking device, and a remote operation mechanism for connection locking when a telescopic cylinder contracts.
Figure 5:
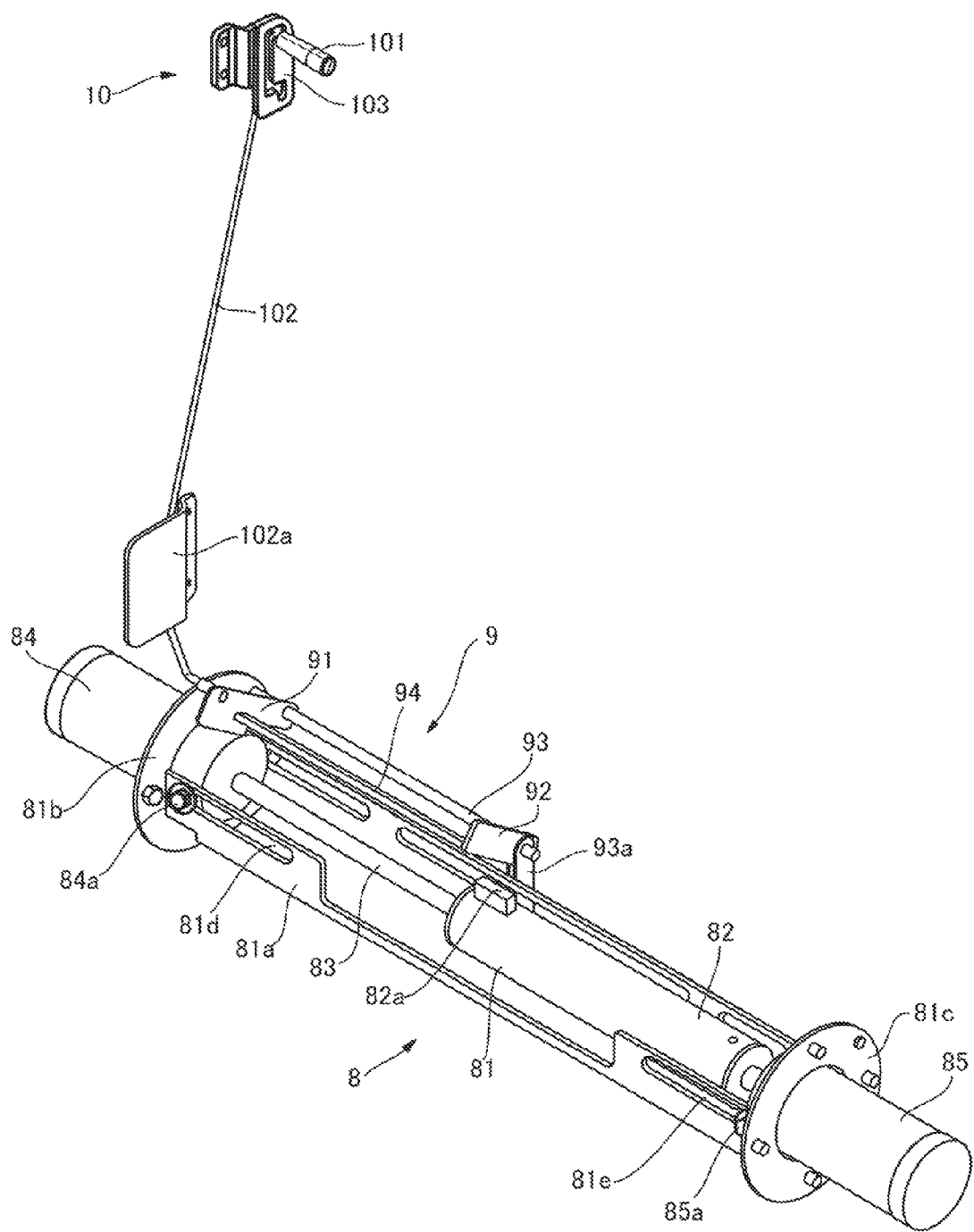
FIG. 5 is a drawing showing an arrangement of the connection device, the connection locking device, and the remote operation mechanism for connection locking when the telescopic cylinder extends.

As shown in FIGS. 4 and 5, the connection device 8 is provided between the left inside carrier frame side plate 41 and the right inside carrier frame side plate 41, and includes a telescopic cylinder 81 that extends and contracts in the width direction of the carrier frame 4; a cylinder support member 81a that supports the telescopic cylinder 81; and the rod pin 84 and the tube pin 85 provided at the ends of the telescopic cylinder, respectively.

The telescopic cylinder 81 is a hydraulic cylinder constituted by a tube 82 and a piston rod 83. The rod pin 84 is mounted on the protruding end of the piston rod 83, while the tube pin 85 is provided in the end of the tube 82 opposite to the piston rod 83. The rod pin 84 is a cylindrical connecting pin that extends in the direction in which the piston rod 83 protrudes. The tube pin 85 is also a cylindrical connecting pin that extends in the direction opposite to the protruding direction of the piston rod 83. A rod pin fixing part 84a is provided on the base end side of the rod pin 84, which penetrates the rod pin 84 in the front-to-rear direction and protrudes in the radial direction of the rod pin 84. Meanwhile, a tube pin fixing part 85a is provided on the base end side of the tube pin 85, which penetrates the rod pin 85 and protrudes in the radial direction. A rectangular solid-shaped tube block 82a is provided on the upper surface of the end part of the tube 82 that faces the piston rod 83.

The cylinder support member 81a extends in the longitudinal direction of the telescopic cylinder 81, and surrounds the telescopic cylinder 81 from the front-to-rear direction and the lower direction. A support flange 81b is fixed to the periphery of the carrier frame pin hole 44 formed in the right inside carrier frame side plate 41 as shown in FIG. 3. Meanwhile a support flange 81c is fixed to the periphery of the carrier frame pin hole 44 formed in the left inside carrier frame plate 41. Therefore, the telescopic cylinder 81 and the cylinder support member 81a are provided on the rear end of the carrier frame 4 the width direction of the carrier frame 4 that is their longitudinal direction. A rod pin guide hole 81d is formed in the cylinder support member 81a in the support flange 81b side. This rod pin guide hole 81d is a long hole that extends in the longitudinal direction of the cylinder support member 81a and that supports the rod pin fixing part 84a to be able to slide in the longitudinal direction of the cylinder support member 81a. Meanwhile, a tube pin guide hole 81e is formed in the cylinder support member 81a in the support flange 81c side. This tube pin guide hole 81e is a long hole that extends in the longitudinal direction of the cylinder support part 81a and that supports the tube pin fixing part 85a to be able to slide in the longitudinal direction of the cylinder support member 81a.

As shown in FIG. 4, when the piston rod 83 is accommodated in the tube 82 and the telescopic cylinder 81 contracts, the rod pin 84 and the tube pin 85 fall within the cylinder support member 81a in the longitudinal direction. Then, as shown in FIG. 5, when the telescopic cylinder 81 extends, the piston rod 83 protrudes from the tube 82 and moves to the support flange 81b side. By this means, the rod pin 84 passes through the support flange 81b and protrudes from the end part of the cylinder support member 81a in the longitudinal direction while the tube pin 85 passes through the support flange 81c and protrudes from the end part of the cylinder support member 81a in the longitudinal direction.

As described above, when the telescopic cylinder 81 extends, the rod pin 84 having passed through the support flange 81b is inserted into the carrier frame pin holes 44 respectively formed in the two right carrier frame side plates 41. Meanwhile, the tube pin 85 having passed through the support flange 81c is inserted into the carrier frame pin holes 44 respectively formed in the two left carrier frame side plates 41.

The connection locking device 9 is provided on the cylinder support member 81a to restrict the extended telescopic cylinder 81 from contracting. The connection locking device 9 includes: a first locking plate 91 and a second locking plate 92 that extend in the direction orthogonal to the extending direction of the telescopic cylinder 81; a support shaft 93 formed in a rod shape that extends parallel to the extending direction of the telescopic cylinder 81 and that supports the first locking plate 91 and the second locking plate 92; and a connection plate 94 formed in a plate shape that connects between the first locking plate 91 and the second locking plate 92.

The first locking plate 91 is provided in the cylinder support member 81a in the support flange 81b side and is rotatably supported by the support shaft 93 on its first end part. The connection plate 94 is connected to the side surface of the first locking plate 91 in the second end part side, which faces the support flange 81c. The second locking plate 92 is provided on an approximately middle part of the cylinder support member 81a in the longitudinal direction and is rotatably supported by the support shaft 93 on its first end part. The connection plate 94 is connected to the side surface of the second locking plate 92 in the second end part side, which faces the support flange 81b. One end of the support shaft 93 is connected to a support shaft bracket 93a provided on an approximately middle part of the cylinder support member 81a in the longitudinal direction, while the other end is connected to the support flange 81b.

The connection locking device 9 can be operated by using a remote operation mechanism 10 for connection locking. The remote operation mechanism 10 for connection locking includes: a locking operation lever 101 that can be held and operated by the user; a flexible link wire 102 that connects the second end part of the first locking plate 91 to the base end of the locking operation lever 101; a link-up part 102a that supports the link wire 102 between the first locking plate 91 and the locking operation lever 101; and a lever support plate 103 mounted on the upper part of the right inside carrier frame side plate 41 that supports the locking operation lever 101 and guides the locking operation lever 101 in the vertical direction, restricting the locking operation lever 101 from moving in the horizontal direction.

Figure 7A:
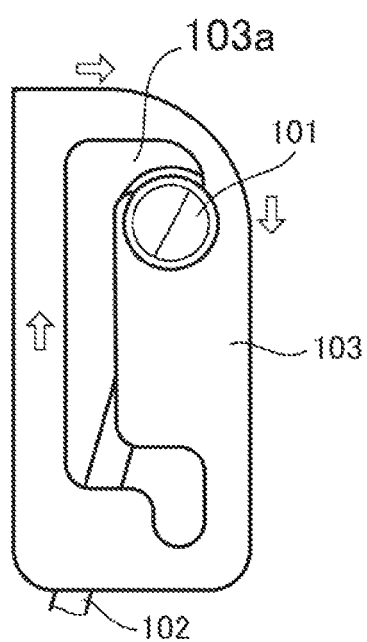
FIG. 7A is a front view showing a locking operation lever when the connection locking device does not lock the connection device.
Figure 8A:
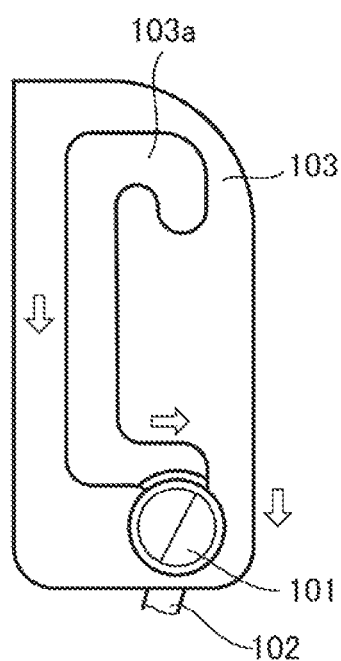
FIG. 8A is a front view showing the locking operation lever when the connection locking device locks the connection device.

When the user operates and moves the locking operation lever 101 upward, which is provided near the upper part of the carrier frame side plate 41, the first end part of the first locking plate 91 in connection with the link wire 102 and the first end part of the second locking plate 92 connected to the first locking plate 91 via the connection plate 94 are raised. On the other hand, when the user operates and moves the locking operation lever 101 downward, which is formed on the carrier frame side plate 41, the first end part of the first locking plate 91 and the first end part of the second locking plate 92 that are raised by the link wire 102 are lowered. Here, as shown in FIGS. 7A and 8A, the lever support plate 103 that supports the locking operation lever 101 has a lever slit 103a that extends in the vertical direction. The locking operation lever 101 can move along this lever slit 103a. The upper end and the lower end of the lever slit 103a extend in the horizontal direction and then extend downward. The locking operation lever 101 is supported by the bottom of each of the downwardly extending portions, so that it is possible to hold the locking operation lever 101 on the upper end and the lower end of the lever slit 103a.

Next, how to lock the extended telescopic cylinder 81 of the connection device 8 by using the connection locking device 9, is explained with reference to FIGS. 4 to 6. As shown in FIG. 4, the base end of the rod pin 84 approaches the tube block 82a formed on the tube 82 while the telescopic cylinder 81 contracts. In this case, the locking operation lever 101 of the remote operation mechanism 10 for connection locking has moved upward as shown in FIG. 7A, and the second end part of each of the first locking plate 91 and the second locking plate 92 in connection with the connection plate 94 is raised as shown in FIG. 7B.

Then, as shown in FIG. 5, when the telescopic cylinder 81 extends, the end part of the rod pin 84 that faces the tube 82 moves to the vicinity of the support flange 81b, and the tube block 82a moves to an approximately middle part of the cylinder support member 81a in the longitudinal direction, so that the distance between the end part of the rod pin 84 that faces the tube 82 and the tube block 82a increases.

Figure 6:
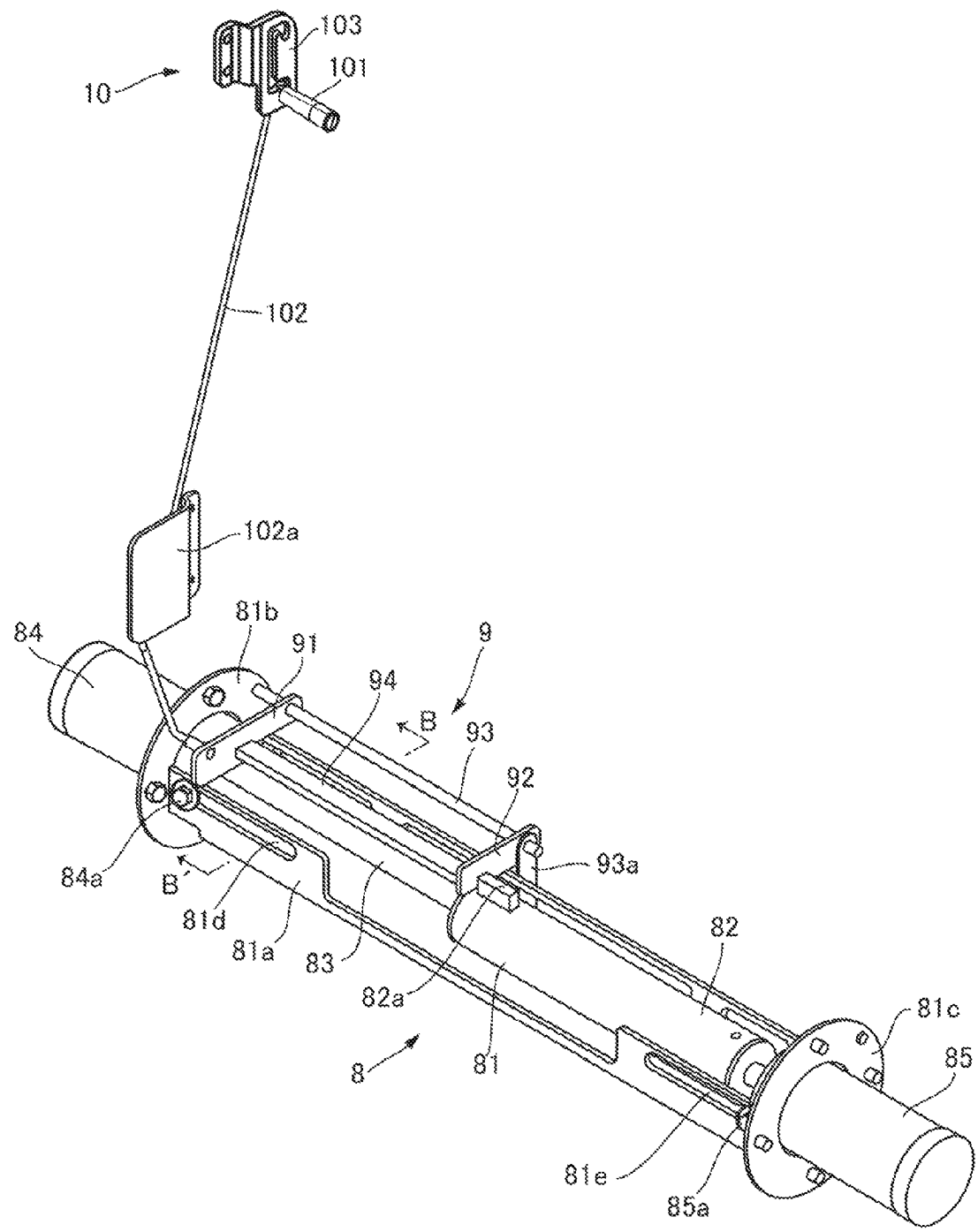
FIG. 6 is a drawing showing an arrangement of the connection device, the connection locking device, and the remote operation mechanism for connection locking when the connection device is locked by the connection locking device.
Figure 7B:
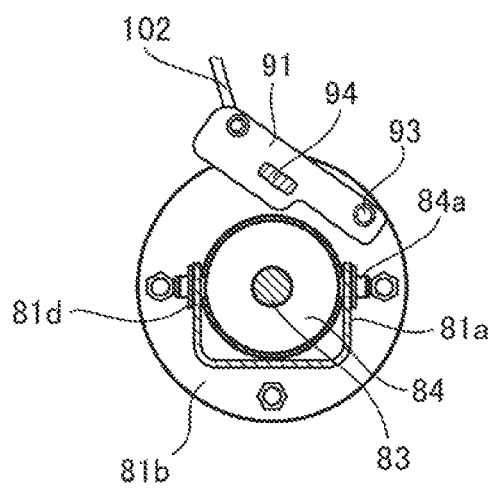
FIG. 7B is a cross-sectional view taken along line A-A' of FIG. 4.
Figure 8B:
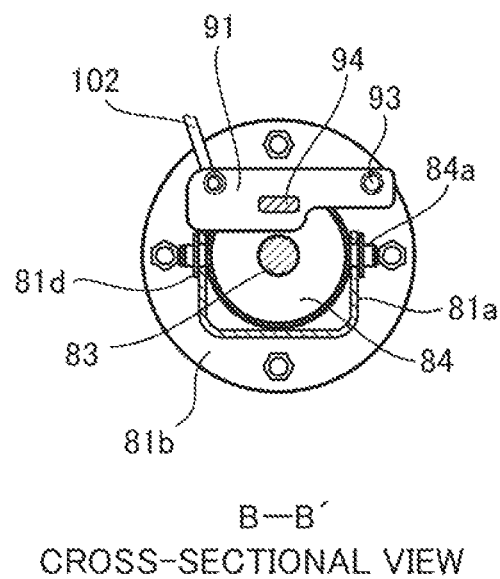
FIG. 8B is a cross-sectional view taken along line B-B' of FIG. 6.

When the locking lever 101 is operated while the telescopic cylinder 81 is extended, the connection locking device 9 restricts the telescopic cylinder 81 from contracting as shown in FIG. 6. That is, when the locking operation lever 101 is moved downward as shown in FIG. 8A, the first locking plate 91 in connection with the link wire 102 and the second locking plate 92 connected to the first locking plate 91 via the connection plate 94 rotate about the support shaft 93. The second end parts of the rotated first locking plate 91 and the second locking plate 92 are lowered as shown in FIG. 8B, and therefore the first locking plate 91 and the second locking plate 92 are set between the end part of the rod pin 84 that faces the tube 82 side and the tube block 82a.

As described above, the connection locking device 9 rotates the first locking plate 91 and the second locking plate 92 to set them between the rod pin 84 and the tube 82, so as to restrict the extended telescopic cylinder 81 from contracting. That is, the first locking plate 91 abuts on the end part of the rod pin 84 that faces the tube 82 to restrict the rod pin 84 from moving to the tube 82 side, while the second locking plate 92 abuts on the end part of the tube block 82a that faces the rod pin 84 to restrict the tube 82 from moving to the rod pin 84 side. This prevents the piston rod 83 from being inserted into the tube 82, so that it is possible to restrict the telescopic cylinder 81 from contracting.

Next, how to connect the outrigger 7 to the carrier frame 4 will be described. First, an outrigger 7 is hoisted by the crane apparatus 3, and moved to a location in which the front end surface of the outrigger 7 faces the rear end surface of the carrier frame 4. Next, the right outrigger side plate 71 is inserted between the two right carrier frame side plates 41; the left outrigger side plate 71 is inserted into the two left carrier frame side plates 41; and the outrigger pins 72 are made to contact with the pin guide parts 43. Next, the outrigger 7 is lowered, with outrigger pins 72 lying on the pin guide parts 43, so that the outrigger pins 72 engages with the pin engagement parts 42.

Next, the outrigger pin holes 73 are aligned with the carrier frame pin holes 44; the telescopic cylinder 81 is extended; and the rod pin 84 and the tube pin 85 are inserted into the carrier frame pin holes 44 and the outrigger pin holes 73, respectively.

By this means, the outrigger pins 72 provided in the upper parts of the outrigger side plates 71 engage with the pin engagement parts 42, and the outrigger pin holes 73 formed in the lower parts of the outrigger side plates 71 are connected to the carrier frame pin holes 44 via the connection device 8.

Then, the locking operation lever 101 is operated to rotate the first locking plate 91 and the second locking plate 92, and thereby to restrict the telescopic cylinder 81 from contracting. The lever support plate 103 that supports the locking operation lever 101 is mounted on the upper part of the carrier frame side plate 41, and therefore the user rides on the upper part of the outrigger 7 connected to the carrier frame 4 to operate the locking operation lever 101. The connection device 9 restricts the telescopic cylinder 81 from contracting, so that the connection between the outrigger 7 and the carrier frame 4 is locked such that the upper, lower left and right portions of the front part of the outrigger 7 are connected to the rear part of the carrier frame 4.

As described above, the outrigger connection device including the connection device 8, the connection locking device 9 and the remote operation mechanism 10 for connection locking according to the present embodiment performs an operation to lock the connection between the outrigger 7 and the carrier frame 4, remotely from the connection device 8 and the connection locking device 9. Therefore, even if it is difficult for the worker to approach the location in which the connection device 8 and the connection locking device 9 are provided, or it is not possible to find a work space near the connection device 8 and the connection locking device 9, the worker can lock the connection between the carrier frame 4 and the outrigger 7 with the connection device 8 by operating the connection locking device 9.

Moreover, with the remote operation mechanism 10 for connection locking according to the present embodiment, the connection locking device 9 is operated by using the locking operation lever 101 connected to the connection locking device 9 via the link wire 102. Therefore, it is enough to only make a space to provide the link wire 102 between the connection locking device 9 and the locking operation lever 101, and therefore it is possible to improve the degree of freedom of the installation location of the locking operation lever 101.

Moreover, with the present embodiment, the connection locking device 9 restricts the extended telescopic cylinder 81 from contracting so as to restrict the rod pin 84 and the tube pin 85 that are inserted into the carrier frame pin holes 44 and the outrigger pin holes 73 from moving. By this means, it is possible to surely prevent the rod pin 84 and the tube pin 85 from removing from the carrier frame pin holes 44 and the outrigger pin holes 73.

Moreover, with the connection locking device 9 according to the present embodiment, the first locking plate 91 abuts on the end part of the rod pin 84 that faces the tube 82, while the second locking plate 92 abuts on the end part of the tube block 82a that faces the rod pin 84, so that if is possible to restrict the telescopic cylinder 81 from contracting. Therefore, if is possible to prevent the rod pin 84 and the tube pin 85 from dropping off with the simple structure, and therefore to reduce the failure frequency of the connection locking device 9, saving the cost of the connection locking device 9.

As described above, the outriggers 7 are removably mounted to the carrier frame 4. Therefore, the outriggers 7, which are particularly heavy components of the crane apparatus 3 can be taken on a trailer and delivered, separately from the carrier frame 4.

With the present embodiment, although the outrigger pins 72, the rod pin 84 and the tube pin 85 are formed in a cylindrical shape, if is by no means limiting, but they may be formed in a quadrangular prism shape or triangular prism shape. In this case, it is preferred that the shape of the outrigger pins 72 fits the shape of the pin engagement parts 42, and the shape of the carrier frame pin holes 44 and the shape of the outrigger pin holes 73 fit the shape of the rod pin 84 and the shape of the tube pin 85.

Furthermore, with the present embodiment, although the connection locking device 9 is connected to the locking operation lever 101 through the flexible link wire 102, it is by no means limiting but they may be connected to one another through a rigid link mechanism.

What is claimed is:

1. A crane apparatus comprising:
   a carrier frame on which a swivel base is mounted, the swivel base supporting a boom so as to be raised and lowered;
   an outrigger removably mounted to the carrier frame; and
   an outrigger connection locking device including:
   a connection pin that can be inserted into a carrier frame hole formed in the carrier frame and into an outrigger hole formed in the outrigger;
   a telescopic cylinder configured to perform a telescopic motion that allows the connection pin to move to a location in which the connection pin is inserted into the carrier frame hole and the outrigger hole;
   a connection locking unit configured to restrict the connection pin inserted into the carrier frame hole and the outrigger hole from moving; and
   a remote operation mechanism for connection locking that can operate the connection locking unit, the remote operation mechanism being located remotely from the connection locking unit, and including:
   an operation lever configured to operate the connection locking unit; and
   a link mechanism configured to connect the operation lever to the connection locking unit, the connection locking unit is moved according to an operation of the operation lever via the link mechanism.

2. The crane apparatus according to claim 1, wherein:
   the connection pin is inserted into the carrier frame hole and the outrigger hole by extending the telescopic cylinder; and
   the connection locking unit restricts the extended telescopic cylinder from contracting.

3. The crane apparatus according to claim 2, wherein:
protruding portions are formed on a piston rod and a tube of the telescopic cylinder, respectively, the protruding portions protruding in a radial direction of the telescopic cylinder; and
the connection locking unit is set between the protruding portions by an operation of the remote operation mechanism for connection locking to restrict the extended telescopic cylinder from contracting.

4. The crane apparatus according to claim 1, including a support member that supports and guides the operation lever, the support member being mounted on the carrier frame remotely from the connection locking unit.

5. The crane apparatus according to claim 1, including a support part that supports the link mechanism on the carrier frame between the connection locking unit and the operation lever.

* * * * *